Figure 1:
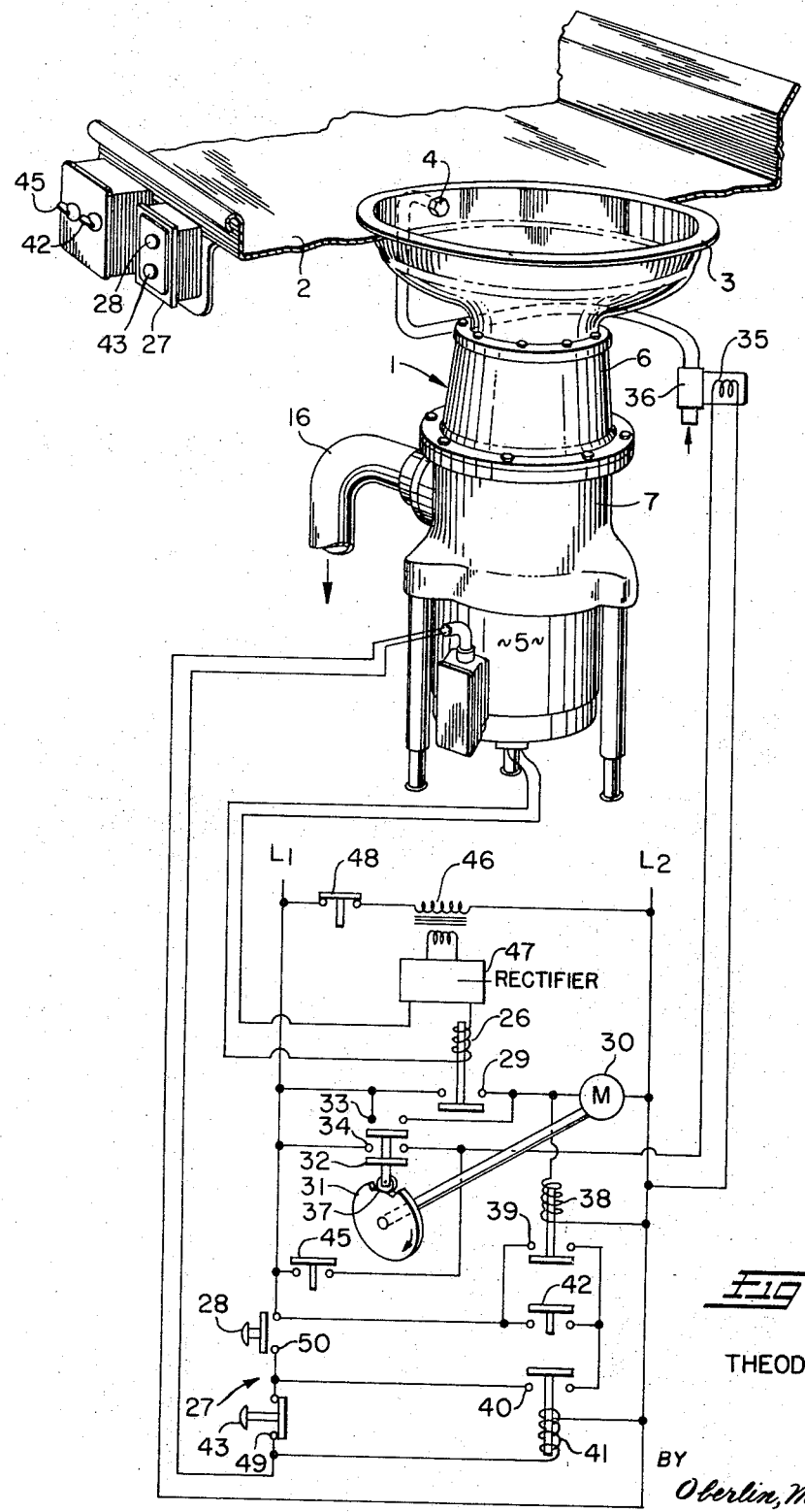

Oct. 3, 1967 T. F. MEYERS 3,344,996
FOOD WASTE DISPOSER AND CONTROL THEREFOR
Filed July 2, 1965 2 Sheets-Sheet 1

INVENTOR
THEODORE F. MEYERS

BY
Oberlin, Maky & Donnelly
ATTORNEYS

United States Patent Office 3,344,996
Patented Oct. 3, 1967

3,344,996
FOOD WASTE DISPOSER AND CONTROL THEREFOR
Theodore F. Meyers, Wadsworth, Ohio, assignor, by mesne assignments, to The Hobart Manufacturing Company, Troy, Ohio, a corporation of Ohio
Filed July 2, 1965, Ser. No. 469,142
20 Claims. (Cl. 241—46)

The present invention relates generally as indicated to a food waste disposer and control therefor, and more particularly to a food waste disposer and control therefor having provision for effecting economies in water usage and/or electric power.

Hitherto, in the case of heavy duty commercial disposers as are used in the kitchens of food preparation areas of hospitals, restaurants, cafeterias, commissaries, markets, etc., is is a prevalent practice for the kitchen employees to energize the disposers and to turn on the flushing water therefor and then, after loading the disposers with food waste, going about performing other duties during the grinding operation. Accordingly, the disposers and water therefor may be left on for long periods of time after the grinding operations have been completed. In the case of a large commercial disposer which may be driven by a 7½ H.P. or larger electric motor (grinding capacity of 4,000 lbs./hr. or more) substantial electric power may be saved by automatically shutting off the drive motor when the grinding operation is completed. Similarly, a large commercial disposer requires a substantial water flow to assist in flushing the comminuted refuse into the sewer, for example, 500 gallons per hour, and thus again substantial economies are effected by automatically shutting off the flushing water supply at the conclusion of the grinding operation.

Accordingly, it is a principal object of this invention to provide a food waste disposer and control therefor in which the water supply and/or electric supply to the disposer is automatically cut off after the grinding operation has been completed.

It is another object of this invention to provide a food waste disposer and control therefor which is arranged so that the electric drive motor may be started manually but will be deenergized if no food waste is being ground when the operator releases the start switch.

It is another object of this invention to provide a food waste disposer and control therefor of the character indicated wherein the start button when pressed by the operator, energizes the electric drive motor for the disposer and only if there is food waste being ground will the flushing water flow into the disposer; otherwise, upon release of the start switch, the drive motor will be automatically deenergized.

It is another object of this invention to provide a food waste disposer and control therefor which may be continuously operated simply by continuously supplying food waste into the disposer.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail in certain illustrative embodiment of the invention, this being indicative, however, of but one of the various ways in which the principle of the invention may be employed.

Figure 2:
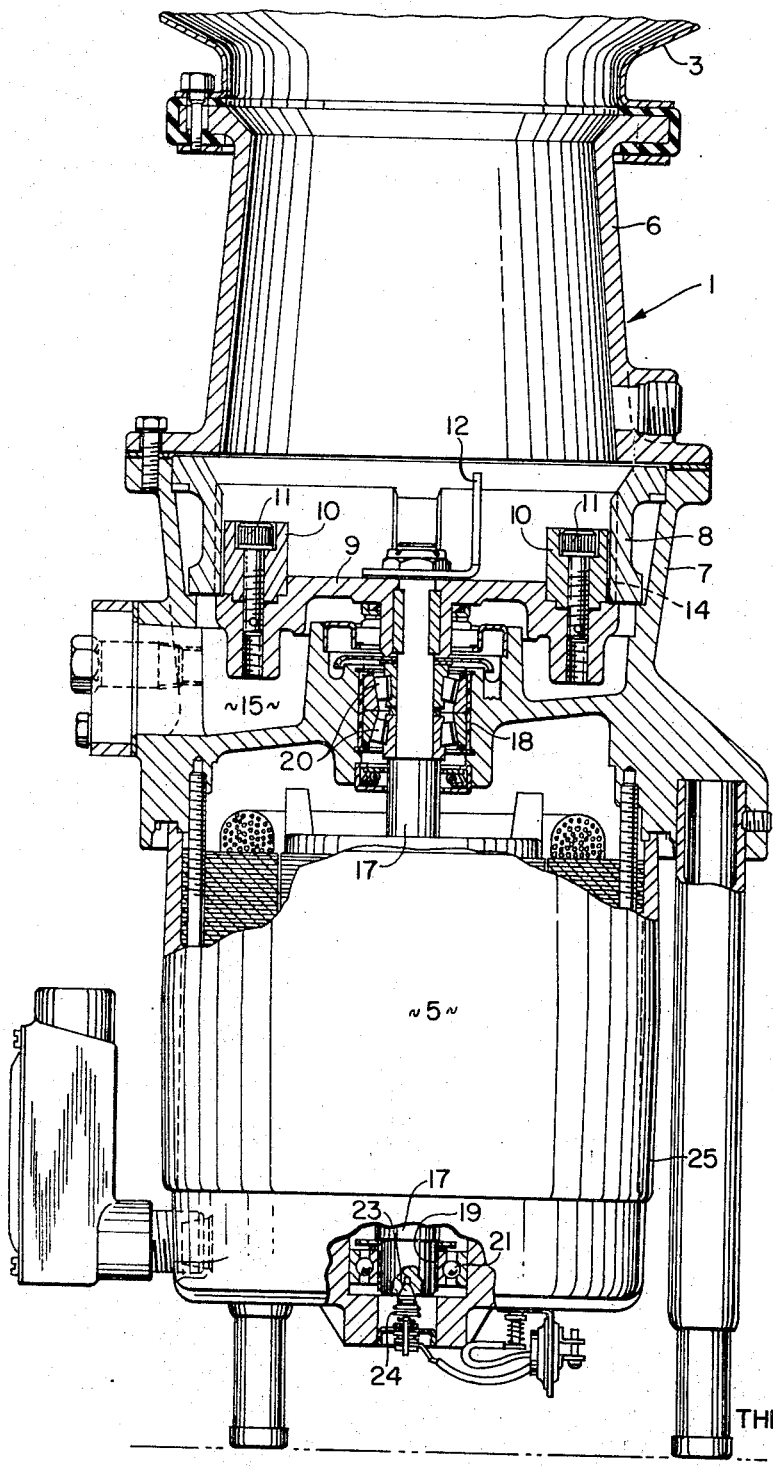

In said annexed drawing:

FIG. 1 is a perspective view of a food waste disposer with the control therefor being shown schematically; and FIG. 2 is a central vertical cross-section view of the disposer.

Referring now more particularly to the drawing, FIG. 1 shows a typical commercial installation of a food waste disposer 1 as would be employed, for example, in a restaurant kitchen where food may be prepared on the adjoining table 2 and scraps discharged into the disposer through the funnel-shaped inlet hopper 3. Similarly, for kitchen clean-up operations, food waste from dishes and utensils may simply be dumped into the disposer 1.

The hopper 3 will usually be provided with a water outlet fitting 4 to flush waste material from the hopper 3 into the disposer 1. Kitchen personnel may leave the food preparation or clean-up area to perform other tasks thus leaving the water running into the disposer 1 and leaving the disposer motor 5 energized for long periods of time, whereby such water power and electric power is wasted when there is no food waste being loaded into the disposer 1.

It has been found that all food wastes even those containing small amounts of water are electrically conductive, whereby such electrical conductivity is herein employed to control the water supply and/or the electric supply to the disposer 1, whereby the water supply and/or the disposer motor are shut off if food waste is not being introduced into the disposer 1.

Referring now to FIG. 2, the disposer 1 herein shown comprises an upper housing 6 constituting an extension of hopper 3 and a lower housing 7 having a shredder ring 8 therein which cooperates with an impeller 9 driven by the electric motor 5 to comminute refuse thereon, the impeller 9 having cutting blocks 10 projecting upwardly therefrom. In this case, the cutting blocks 10 are each of square cross-section to provide new cutting edges four times upon loosening the screws 11 and turning the blocks to new positions. The impeller 9 may also have one or more cutters 12 to assist in breaking up high bulk materials. With the assistance of water flowing into the housing the comminuted refuse is flushed through slots 14 defined between the impeller 9 and shredder ring 8 into the sloped bottom discharge chamber 15 from whence the comminuted refuse and water mixture flow into a sewer via the discharge pipe 16 connected to the lower housing 6.

In the present case, the impeller 9 and motor armature shaft 17 are electrically insulated from the housing assembly as by means of insulating sleeves 18 and 19 around and within the respective upper and lower armature shaft bearings 20 and 21.

Low voltage D.C. is applied through the contact 23 and spring 24 at the lower end of the armature shaft 17 and the housing assembly including upper and lower housings 6 and 7 and motor housing 25 is at ground potential. When there is no food waste being comminuted by the disposer 1 there is a circular air gap between the impeller 9 and the surrounding shredder ring 8, and thus the resistance to current flow across such gap is very high, so that there is virtually no measurable current flow through the relay 26 of such low voltage D.C. circuit.

The main control switch 27 is such that when the start button 28 is depressed, the motor 5 will be energized but, upon release of the start button 28, the motor 5 will be de-energized unless food waste in the dispenser bridges the air gap aforesaid to cause current flow through the relay 26 of the low voltage D.C. circuit. When that occurs, the contacts 29 of the relay 26 will be closed to energize the timer motor 30, and in this case, the timer motor 30 turns the cam 31 to close the switch 32, i.e., the holding contacts 33 in the timer motor circuit and the contacts 34 in the solenoid 35 circuit of water control valve 36.

Thus, with a 1 r.p.m. cam 31, the timer motor 30 will be locked in for 53 seconds as will the solenoid 35. If, after the cutout portion 37 of the cam 31 reaches switch 32 to open the solenoid 35 circuit to shut off the water valve 36, there is no more food waste in the disposer, the relay 26 will drop out to open the circuit of timer motor 30. However, if there is food waste at that time, the timer motor 30 will continue to operate thus to cause cam 31 to reclose switch contacts 33 and 34 to repeat the cycle.

The timer motor 30 circuit has in parallel therewith a relay 37 which has contacts 39 in series with the contacts 40 of the holding relay 41 of the main drive motor 5 circuit. When the timer motor 30 is deenergized the contacts 39 and 40 are opened to deenergize motor 5.

The holding circuit of motor 5 also has a manually operated switch 42 which, when closed, will maintain the drive motor 5 energized until the stop button 43 is pressed in. Likewise, the solenoid 35 circuit has a manually operated switch 45 which, when closed, will maintain the solenoid 35 energized for continued water flow through valve 36 and fitting 4 despite opening of the timer motor 30 circuit.

The low voltage D.C. source is obtained as through transformer 46 and rectifier 47. A switch 48 may be opened so that control of the solenoid valve 36 and drive motor 5 is through switches 45 and 42 respectively. Thus, with switch 42 closed, when the start button 28 is pushed in the motor 5 is energized through the contacts 49 of stop switch 43 and continues to run through switch 42 and the contacts 40 of the relay 41 even though the release of the start button 28 opens the contacts 50.

For automatic control of the solenoid valve 36 and the drive motor 5 the switches 42 and 45 will be open as shown in FIG. 1.

One advantage of the present control system is that the mineral content and conductivity of tap water is not a factor. The air gap between the impeller 9 and shredder ring 8 senses only the conductivity of food particles thereacross. When operation of the disposer 1 is initiated there may be hundreds, if not thousands, of food waste particles bridging the air gap in parallel to permit sufficient current flow to energize relay 26.

In lieu of the circular air gap herein, it is contemplated to provide an insulated D.C. contact in the shredder ring 8 itself, whereby food waste bridging the space between the contact and the shredder ring will permit current flow to energize the relay 26. Furthermore, it is contemplated to employ, for example, a vibration-sensitive element such as a piezoelectric crystal or phonograph pickup in the shredder ring 8 so that the presence of food waste in the housing 7 will cause activation of a probe of the crystal or pickup which, through an amplifier, will establish a current flow to energize the relay.

Yet another alternative is to provide sensing elements in either the discharge chamber 15 or in the discharge pipe 16 which sense the difference in electrical resistance of tap water without comminuted waste material therein and of tap water with waste material therein whereby, in the latter case, the disposer 1 will remain in operation with water flow thereinto until such resistance decreases to that of the uncontaminated water supply.

Other modes of applying the principle of the invention may be employed, change being made as regards the details described, provided the features stated in any of the following claims, or the equivalent of such, be employed.

I therefore particularly point out and distinctly claim as my invention:

1. In combination, a food waste disposer having a housing with a feed opening for introduction of food waste thereinto and with an outlet opening from which comminuted food waste is conducted to a sewer, a comminuting element rotatable in said housing to comminute food waste therein, a valve-controlled water supply means through which water is introduced into said housing to assist in flushing comminuted waste through said outlet opening, and a driven motor for rotating said element in said housing; and control means for said disposer including food waste sensing means therein operative, in the absence of food waste in said disposer, to turn off said water supply means.

2. In combination, a food waste disposer having a housing with a feed opening for introduction of food waste thereinto and with an outlet opening from which comminuted food waste is conducted to a sewer, a comminuting element rotatable in said housing to comminute food waste therein, a valve-controlled water supply means through which water is introduced into said housing to assist in flushing comminuted waste through said outlet opening, and a drive motor for rotating said element in said housing; and control means for said disposer including sensing means therein operative, in the absence of food waste in said disposer, to deenergize said drive motor.

3. In combination, a food waste disposer having a housing with a feed opening for introduction of food waste thereinto and with an outlet opening from which comminuted food waste is conducted to a sewer, a comminuting element rotatable in said housing to comminute food waste therein, a valve-controlled water supply means through which water is introduced into said housing to assist in flushing comminuted waste through said outlet opening, and a drive motor for rotating said element in said housing; and control means for said disposer including sensing means therein operative, in the absence of food waste in said dispenser, to turn off said water supply means and to deenergize said drive motor.

4. The combination of claim 3 wherein manually operated means are provided selectively and conjointly to continue water supply into said disposed and to maintain said drive motor energized despite absence of food waste in said disposer.

5. In combination, a food waste disposer having a housing with a feed opening for introduction of food waste thereinto and with an outlet opening from which comminuted food waste is conducted to a sewer, a comminuting element rotatable in said housing to comminute food waste therein, a valve-controlled water supply means through which water is introduced into said housing to assist in flushing comminuted waste through said outlet opening, and a drive motor for rotating said element in said housing; and control means for said disposer including food waste sensing means therein, said sensing means comprising electric circuit means having a gap which, when not bridged by food waste, has such low current flow therethrough that a solenoid valve-controlled water supply means closes.

6. The combination of claim 5 wherein such gap is defined between said comminuting element and said housing.

7. In combination, a food waste disposer having a housing with a feed opening for introduction of food waste thereinto and with an outlet opening from which comminuted food waste is conducted to a sewer, a comminuting element rotatable in said housing to comminute food waste therein, a valve-controlled water supply means through which water is introduced into said housing to assist in flushing comminuted waste through said outlet opening, and a drive motor for rotating said element in said housing; and control means for said disposer including food waste sensing means therein, said sensing means comprising electric circuit means having a gap which, when not bridged by food waste, has such low current flow therethrough that a holding relay opens to deenergize said drive motor.

8. In combination, a food waste disposer having a housing with a feed opening for introduction of food waste thereinto and with an outlet opening from which comminuted food waste is conducted to a sewer, a comminuting element rotatable in said housing to comminute food waste therein, a valve-controlled water supply means through which water is introduced into said housing to assist in flushing comminuted waste through said outlet opening, and a drive motor for rotating said element in said housing; and control means for said disposer including food waste sensing means therein, said sensing means comprising electric circuit means having a gap which, when not bridged by food waste, has such low current flow therethrough that a solenoid valve-controlled water supply means closes and that a holding relay opens to deenergize said drive motor.

9. A food waste disposer comprising a housing having a feed opening for introduction of food waste thereinto and an outlet opening through which comminuted food waste is conducted into a sewer; a motor driven impeller in said housing having cutting edges operative to comminute food waste on said impeller for discharge through said outlet opening with the assistance of water flowing into said housing; and electric circuit means in said disposer including a gap which, when not bridged by food waste, has such low current flow therethrough that a solenoid operated valve closes to discontinue flow of water into said housing.

10. The disposer of claim 9 wherein such gap is defined between said impeller and housing.

11. The disposer of claim 10 wherein insulating means between said impeller and the motor drive shaft therefor electrically insulates them from said housing.

12. A food waste disposer comprising a housing having a feed opening for introduction of food waste thereinto and an outlet opening through which comminuted food waste is conducted into a sewer; a motor driven impeller in said housing having cutting edges operative to comminute food waste on said impeller for discharge through said outlet opening with the assistance of water flowing into said housing; and electric circuit means in said disposer including a gap which, when not bridged by food waste, has such low current flow therethrough that a holding relay opens to deenergize said motor.

13. The disposer of claim 12 wherein such gap is defined between said impeller and housing.

14. The disposer of claim 13 wherein insulating means between said impeller and the motor drive shaft therefor electrically insulates them from said housing.

15. A food waste disposer comprising a housing having a feed opening for introduction of food waste thereinto and an outlet opening through which comminuted food waste is conducted into a sewer; a motor driven impeller in said housing having cutting edges operative to comminute food waste on said impeller for discharge through said outlet opening with the assistance of water flowing into said housing; and electric circuit means in said disposer including a gap which, when not bridged by food waste, has such low current flow therethrough that a solenoid operated valve closes to discontinue flow of water into said housing and that a holding relay opens to deenergize said motor.

16. The disposer of claim 15 wherein such gap is defined between said impeller and housing.

17. The disposer of claim 16 wherein insulating means between said impeller and the motor drive shaft therefor electrically insulates them from said housing.

18. An electric control circuit for a food waste disposer of the type having an electric drive motor and having associated therewith a solenoid valve for controlling water flow into said disposer; said circuit comprising switch means to energize said motor and said solenoid valve; and a control circuit having sensing means with a gap which, when not bridged by food waste in said disposer, has such low current flow therethrough that such solenoid valve closes to discontinue flow of water in said disposer.

19. An electric control circuit for a food waste disposer of the type having an electric drive motor and having associated therewith a solenoid valve for controlling water flow into said disposer; said circuit comprising switch means to energize said motor and said solenoid valve; and a control circuit having sensing means with a gap which, when not bridged by food waste in said disposer, has such low current flow therethrough that a holding relay is opened to deenergize such motor.

20. An electric control circuit for a food waste disposer of the type having an electric drive motor and having associated therewith a solenoid valve for controlling water flow into said disposer; said circuit comprising switch means to energize said motor and said solenoid valve; and a control circuit having sensing means with a gap which, when not bridged by food waste in said disposer, has such low current flow therethrough that such solenoid valve closes to discontinue flow of water in said disposer and that a holding relay opens to deenergize such motor.

References Cited

UNITED STATES PATENTS

| | | |
|---|---|---|
| 2,518,176 | 8/1950 | Powers. |
| 2,619,654 | 12/1952 | Coss. |
| 2,880,941 | 4/1959 | Fox et al. |
| 2,939,639 | 6/1960 | Coss _____ 241—100.5 |

WILLIAM W. DYER, JR., *Primary Examiner.*

W. D. BRAY, *Assistant Examiner.*